(12) United States Patent
Maccario

(10) Patent No.: US 8,146,927 B2
(45) Date of Patent: Apr. 3, 2012

(54) WHEELED GOLF CLUB BAG CARRIER

(76) Inventor: Susan C. Maccario, Naples, FL (US)

( * ) Notice: Subject to any disclaimer, the term of this patent is extended or adjusted under 35 U.S.C. 154(b) by 286 days.

(21) Appl. No.: 12/409,279

(22) Filed: Mar. 23, 2009

(65) Prior Publication Data

US 2010/0237576 A1    Sep. 23, 2010

(51) Int. Cl.
*B62B 1/06*    (2006.01)
(52) U.S. Cl. .................. 280/47.26; 280/47.371
(58) Field of Classification Search ........... 280/28.12, 280/202, 33.996, 63–77, 47.26, 47.131; 206/315.1, 206/315.2, 315.3
See application file for complete search history.

(56) References Cited

U.S. PATENT DOCUMENTS

| | | | |
|---|---|---|---|
| 2,467,076 A | 4/1949 | Birnberg | |
| 2,687,895 A * | 8/1954 | Rutledge | 280/47.26 |
| 2,806,711 A * | 9/1957 | Jacobs | 280/47.19 |
| 3,042,602 A | 7/1962 | Melklejohn | |
| 3,784,138 A * | 1/1974 | Herling et al. | 248/96 |
| 5,288,099 A * | 2/1994 | Wu | 280/646 |
| 5,924,709 A | 7/1999 | Yang | |
| 6,068,270 A | 5/2000 | Kim | |
| 6,216,865 B1 * | 4/2001 | Maeng | 206/315.6 |
| 6,386,558 B1 * | 5/2002 | Chang | 280/40 |
| 6,401,998 B1 * | 6/2002 | Puluso | 224/422 |
| 6,672,600 B2 | 1/2004 | Engelhardt et al. | |
| 6,814,361 B2 * | 11/2004 | Tsu | 280/43.1 |
| D541,503 S | 4/2007 | Lee | |
| 7,229,082 B1 * | 6/2007 | Wilmarth | 280/47.26 |
| 7,287,765 B2 * | 10/2007 | Murphy et al. | 280/47.26 |
| 7,416,195 B2 * | 8/2008 | Zwack | 280/47.24 |
| 7,431,313 B1 * | 10/2008 | Torres et al. | 280/47.26 |
| 2003/0071428 A1 | 4/2003 | Kang | |
| 2003/0234503 A1 | 12/2003 | Chiang | |
| 2005/0140103 A1 * | 6/2005 | Marchant et al. | 280/47.26 |
| 2005/0274761 A1 | 12/2005 | Hesmer | |
| 2006/0113346 A1 * | 6/2006 | Togo | 224/608 |
| 2006/0185999 A1 * | 8/2006 | Keays | 206/315.3 |
| 2007/0096415 A1 * | 5/2007 | Reimers | 280/47.131 |
| 2008/0251653 A1 | 10/2008 | Manus | |
| 2009/0149279 A1 * | 6/2009 | Fischer et al. | 473/417 |
| 2010/0096821 A1 * | 4/2010 | Hill | 280/47.26 |
| 2010/0237576 A1 * | 9/2010 | Maccario | 280/47.26 |

* cited by examiner

*Primary Examiner* — J. Allen Shriver, II
*Assistant Examiner* — Emma K Frick
(74) *Attorney, Agent, or Firm* — The Livingston Firm; Edward M. Livingston, Esq.; Bryan L. Loeffler, Esq.

(57) ABSTRACT

A wheeled golf club bag carrier (1) having a base (2) with a tubular wall (3) extending upward a predetermined length. Wheels (4) attached to the underside of the base allow a user to roll the wheeled golf club bag carrier. One or more finger springs (6) may be attached to the inside of the tubular wall. The finger springs apply pressure to the bottom of a golf bag (5) thereby securing the wheeled golf club bag carrier to the bottom of the golf bag. The golf club bag carrier has also a support brace (8) which extends upward from the base and the tubular wall and has a retractable handle (9) attached thereto. A user may secure a golf bag to the support brace via a strap (10).

2 Claims, 3 Drawing Sheets

WHEELED GOLF CLUB BAG CARRIER

BACKGROUND OF THE INVENTION

The present invention relates to wheeled carriers for golf club bags, more particularly, a wheeled golf club bag carrier which fits over the bottom of a golf bag and allows a user to roll the golf bag from one location to another location instead of having to carry the golf bag.

Currently, when a golfer goes golfing the golfer must carry his/her golf bag holding all of the golfer's golf clubs to the golfer's car from the golfer's home and then from the car to a clubhouse. Then, after golfing, the golfer must reverse the process by carrying the golf bag from the club house to the car and then from the car into the home. This can be especially stressful on a golfer's back and shoulders, especially considering the size of golf bags and the weight of a golf bag filled with golf clubs and other golfing accessories. In addition if a golfer lives in an apartment or condo then the golfer has to carry the golf bag even further than normal. Although golf carts, commonly referred to as pull carts, are available to golfers, these pull carts are large and cumbersome because they are designed to go over the rough terrain of golf courses. In addition, many golfers do not use or own pull carts because the majority of golf courses require the use of an electric or gas powered golf cart to make play go faster.

Therefore, a need exists for a wheeled golf club bag carrier which is small, easily adapted to any golf bag and will allow a user to roll a golf bag from one location to another location instead of having to carry the golf bag.

The relevant prior art includes the following patents/applications:

| Patent/Application Number (U.S. unless otherwise stated) | Inventor | Issue/Pub. Date |
| --- | --- | --- |
| 2008/0251653 | Manus | Oct. 16, 2008 |
| D541,503 | Lee | Apr. 24, 2007 |
| 7,229,082 | Wilmarth | Jun. 12, 2007 |
| 2005/0274761 | Hesmer | Dec. 15, 2005 |
| 6,672,600 | Engelhardt et al. | Jan. 06, 2004 |
| 2003/0071428 | Kang | Apr. 17, 2003 |
| DE20307278 | Tang | Aug. 14, 2003 |
| 2003/0234503 | Chiang | Dec. 25, 2003 |
| 6,068,270 | Kim | May 30, 2000 |
| 5,924,709 | Yang | Jul. 20, 1999 |
| 3,042,602 | Meiklejohn | Jul. 10, 1962 |
| GB683,548 | Noel et al. | Dec. 03, 1952 |
| 2,467,076 | Birnberg | Apr. 12, 1949 |

SUMMARY OF THE INVENTION

The primary object of the present invention is to provide a golf club bag carrier that allows a user to wheel a golf bag from one location to another location.

Another object of the present invention is to provide a golf club bag carrier that is compact and easy to use.

A further object of the present invention is to provide a golf club bag carrier that is adaptable to any size golf bag.

Another object of the present invention is to provide a golf club bag carrier that easily attaches to any size golf bag.

The present invention fulfills the above and other objects by providing a wheeled golf club bag carrier having a base with a tubular wall extending upward a predetermined length. Wheels attached to the underside of the base allow a user to roll the wheeled golf club bag carrier. To use the wheeled golf club bag carrier, a user simply places the wheeled golf club bag carrier over the bottom of a golf bag or sets the golf bag into the golf club bag carrier while on the ground. The user may then roll the golf bag over the ground. In addition, one or more finger springs may be attached to the inside of the tubular wall. The finger springs apply pressure to the bottom of a golf bag thereby securing the wheeled golf club bag carrier to the bottom of the golf bag.

In an alternative embodiment, the golf club bag carrier has a support brace which extends upward from the base and the tubular wall. A user may secure a golf bag to the support brace via a strap. In addition, the support brace may be foldable and have a retractable handle which would allow a user to tilt and roll the golf bag.

BRIEF DESCRIPTION OF THE DRAWINGS

In the following detailed description, reference will be made to the attached drawings in which.

DESCRIPTION OF THE PREFERRED EMBODIMENTS

Figure 1:
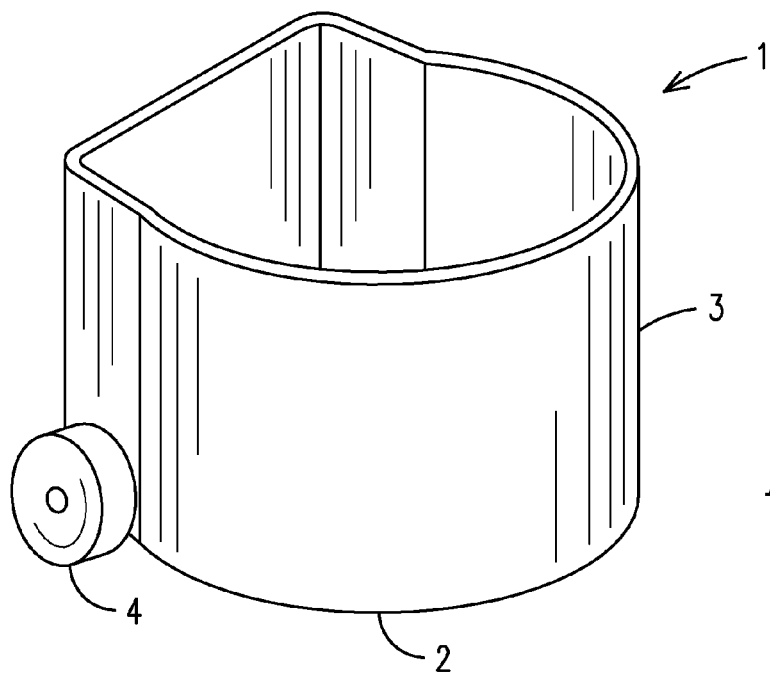
FIG. 1 is a front perspective view of a wheeled golf club bag carrier of the present invention.

For purposes of describing the preferred embodiment, the terminology used in reference to the numbered components in the drawings is as follows:

| |
| --- |
| 1. wheeled golf club bag carrier |
| 2. base |
| 3. tubular wall |
| 4. wheel |
| 5. golf bag |
| 6. finger spring |
| 7. toe plate |
| 8. support brace |
| 9. handle |
| 10. strap |
| 11. hinge |
| 12. foldable section |
| 13. expandable top |

With reference to FIG. 1, a front perspective view of a wheeled golf club bag carrier 1 of the present invention is shown. The wheeled golf club bag 1 carrier has a base 2 with a tubular wall 3 extending upward a predetermined length. Wheels 4 attached to the base 2 allow a user to tilt a golf bag while in the wheeled golf club bag carrier 1 and then roll the golf bag instead of having to carry the golf bag.

Figure 2:
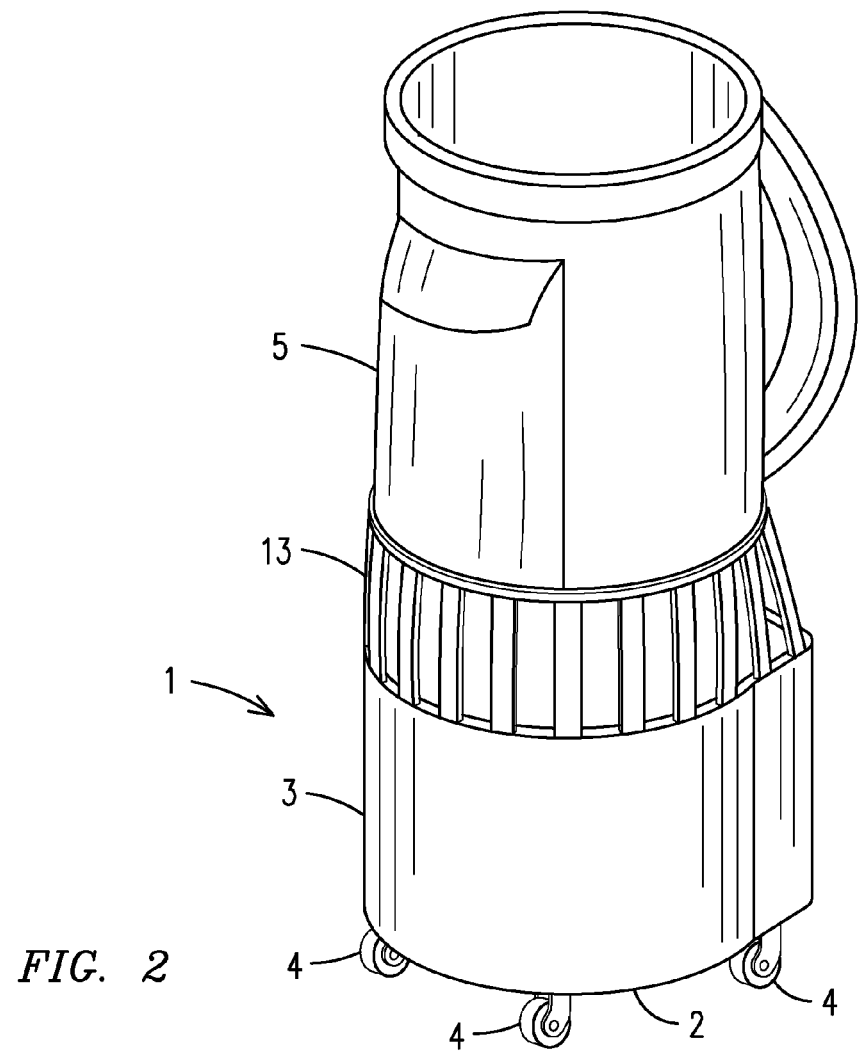
FIG. 2 is a side view of a wheeled golf club bag carrier of the present invention having an expandable top and swivel wheels and attached to a golf bag.

With reference to FIG. 2, a side view of a wheeled golf club bag carrier 1 of the present invention having an expandable top 13 and swivel wheels 4 attached to a golf bag 5 is shown. To use the wheeled golf club bag carrier 1, a user simply places the wheeled golf club bag carrier 1 over the bottom of a golf bag 5 or sets the golf bag 5 into the wheeled golf club bag carrier 1 while on the ground. Swivel wheels 4 attached to the base 2 allow the user to roll the golf bag 5 from one location to another instead of having to carry the golf bag 5. The weight of the golf bag 5 and the tubular wall 3 extending upward from the base 2 keep the wheeled golf club bag carrier 1 secured to the golf bag 5 while in use. In addition, an the top portion of the wheeled golf club bag carrier 1 is expandable so that it can be adapted to any size golf bag 5. The wheels 4 attached to the bottom of the wheeled golf club bag carrier 1 may swivel, as shown in here in FIG. 2, or be fixed, as shown in FIG. 1, or a combination of the two, so that a golf bag may be rolled in a tilted position or a standing position.

Figure 3:
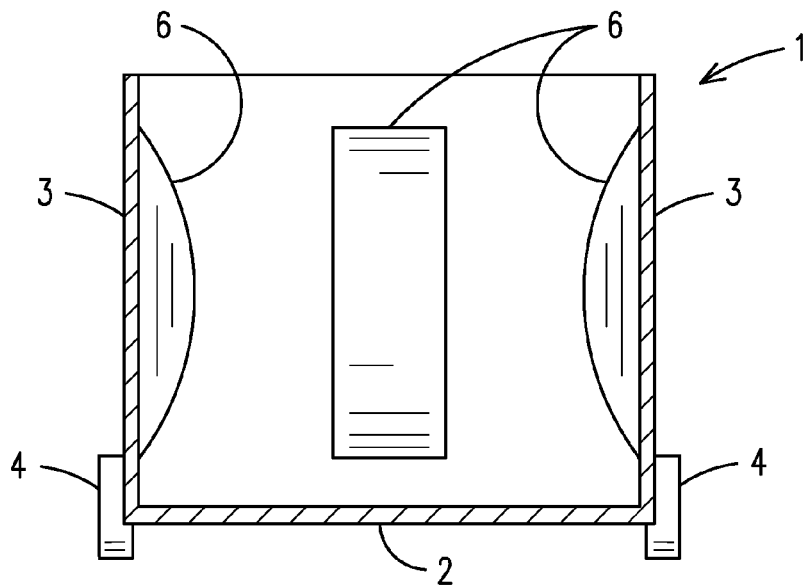
FIG. 3 is a front cutaway view of a wheeled golf club bag carrier of the present invention having finger springs.

With reference to FIG. 3, is a front cutaway view of a wheeled golf club bag carrier 1 of the present invention having finger springs 6 is shown. Finger springs 6 are attached to the inside of the tubular wall 3. The finger springs 6 apply pressure to the sides of a golf bag thereby securing the wheeled golf club bag carrier 1 to the bottom of the golf bag and ensuring that the wheeled golf club bag carrier 1 will stay attached to the bottom of the golf bag if a user lifts the golf bag off of the ground.

Figure 4:
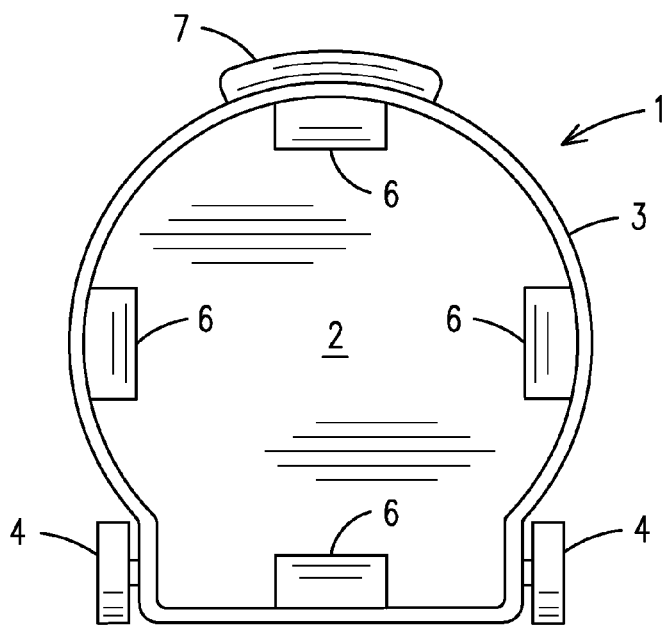
FIG. 4 is a top view of a wheeled golf club bag carrier of the present invention having finger springs.

With reference to FIG. 4, a top view of a wheeled golf club bag carrier 1 of the present invention having finger springs 6 is shown. Finger springs 6 are attached to the inside of the tubular wall 3. A toe plate 7 extends outward from the base 2 of the wheeled golf club bag carrier 1 and allows a user to apply downward pressure to the wheeled golf club bag carrier 1 when removing a golf bag from the wheeled golf club bag carrier 1 by stepping on the toe plate 7.

Figure 5:
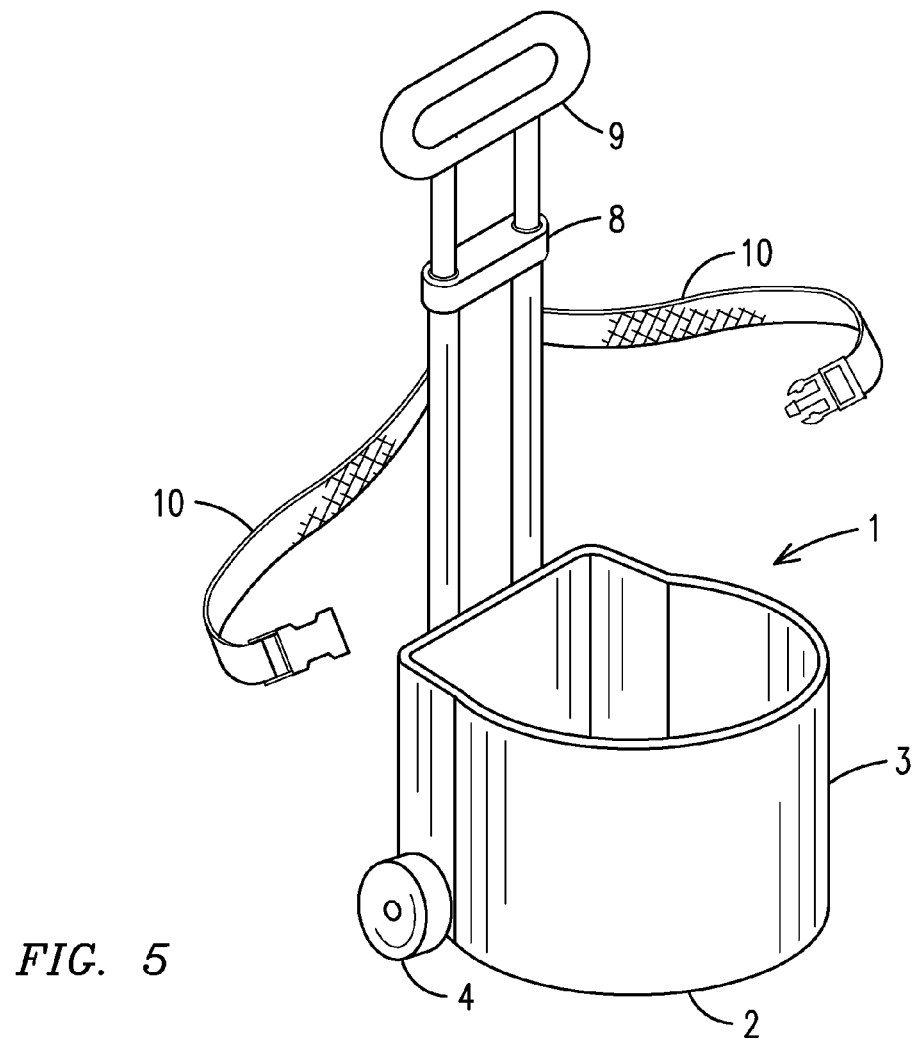
FIG. 5 is a side perspective view of a wheeled golf club bag carrier of the present invention having a support brace and retractable handle.

With reference to FIG. 5, a side perspective view of a wheeled golf club bag carrier 1 of the present invention having a support brace 8 and retractable handle 9. A support brace 8 having a retractable handle 9 extends upward from a base 2 and tubular wall 3. A strap 10 attached to the support brace 8 may be used to secure a golf bag to the wheeled golf club bag carrier 1.

Figure 6:
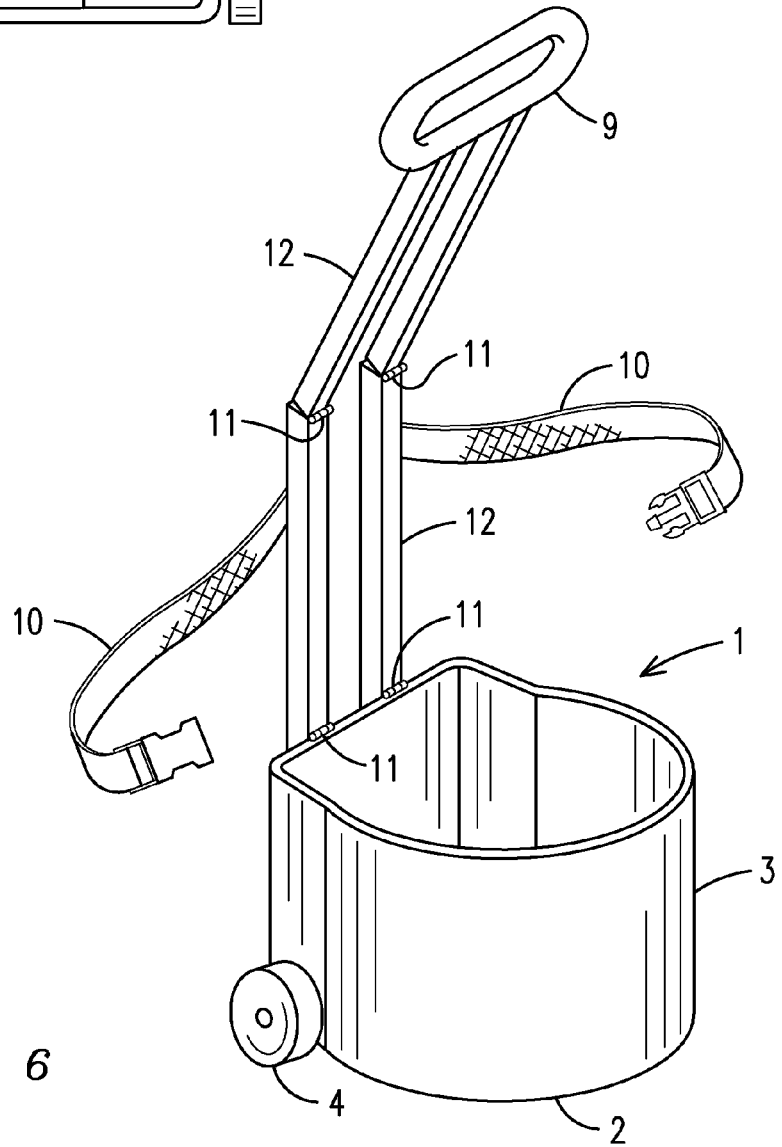
FIG. 6 is a side view of a wheeled golf club bag carrier of the present invention having a foldable support brace and handle attached to a golf bag.

Finally with reference to FIG. 6, a side view of a wheeled golf club bag carrier 1 of the present invention having a foldable support brace 8 is shown which is attached to the wheeled golf club bag carrier 1 via hinges 11. A user may fold the support brace 8 into a folded position for easy storage of the wheeled golf club bag carrier 1 while the wheeled golf club bag carrier 1 is not in use. The foldable support brace 8 may also be made up of individual foldable sections 12 attached to each other by hinges 11.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

Having thus described my invention, I claim:

1. A wheeled golf bag carrier comprising:
a base having an upper surface, a lower surface and a perimeter edge;
a tubular wall extending upward a predetermined distance from the perimeter edge of said base, thereby creating a hollow space into which a bottom portion of a golf bag may be inserted;
at least one finger spring located on an inner surface of the tubular wall;
said at least one finer spring having a lower end attached proximal to a lower edge of the tubular wall and an upper end attached proximal to an upper edge of the tubular wall;
said at least one finger spring also having a middle portion that curves away from the inner surface of the tubular wall, thereby creating tension against the bottom portion of the golf bag and the at least one finger spring when the middle portion is pushed toward the inner surface of the tubular wall by the bottom portion of the golf bag;
at least four swiveling wheels attached to the lower surface of said base and extending downward from the lower surface of said base in such a manner that allows a user to roll a golf bag in the wheeled golf bag carrier while the golf bag is in a fully upright position;
a support brace extending up from one side of the base, said support brace rests against a side of a golf bag when a bottom portion of the golf bag is placed into the base;
a handle extending from the support brace for controlling the movement of the base; and
at least one strap extending from said support brace for securing a golf bag against the support brace so that the golf bag maintains an upright position while in the wheeled golf bag carrier.

2. A wheeled golf bag carrier comprising:
a base having an upper surface, a lower surface and a perimeter edge;
a tubular wall extending upward a predetermined distance from the perimeter edge of said base, thereby creating a hollow space into which a bottom portion of a golf bag may be inserted;
said tubular wall having an expandable and retractable upper edge that completely surrounds the golf bag when the golf bag is inserted into the wheeled golf bag carrier, thereby preventing the wheeled golf bag carrier from slipping off of the golf bag;
at least one finger spring located on an inner surface of the tubular wall;
said at least one finer spring having a lower end attached proximal to a lower edge of the tubular wall and an upper end attached proximal to an upper edge of the tubular wall;
said at least one finger spring also having a middle portion that curves away from the inner surface of the tubular wall, thereby creating tension against the bottom portion of the golf bag and the at least one finger spring when the middle portion is pushed toward the inner surface of the tubular wall by the bottom portion of the golf bag;
at least four swiveling wheels attached to the lower surface of said base and extending downward from the lower surface of said base in such a manner that allows a user to roll a golf bag in the wheeled golf bag carrier while the golf bag is in a fully upright position;
a support brace extending up from one side of the base, said support brace rests against a side of a golf bag when a bottom portion of the golf bag is placed into the base;
a handle extending from the support brace for controlling the movement of the base; and
at least one strap extending from said support brace for securing a golf bag against the support brace so that the golf bag maintains an upright position while in the wheeled golf bag carrier.

* * * * *